(12) United States Patent
Hoekstra-Suurs

(10) Patent No.: US 12,063,951 B2
(45) Date of Patent: Aug. 20, 2024

(54) SET OF BRINE SOLUTIONS AND METHOD FOR IN-LINE PROCESSING FOOD PRODUCTS

(71) Applicant: MAREL FURTHER PROCESSING B.V., Boxmeer (NL)

(72) Inventor: Patricia Hoekstra-Suurs, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 456 days.

(21) Appl. No.: 17/254,144

(22) PCT Filed: Jul. 4, 2019

(86) PCT No.: PCT/NL2019/050411
§ 371 (c)(1),
(2) Date: Dec. 18, 2020

(87) PCT Pub. No.: WO2020/009574
PCT Pub. Date: Jan. 9, 2020

(65) Prior Publication Data
US 2021/0267258 A1   Sep. 2, 2021

(30) Foreign Application Priority Data
Jul. 4, 2018 (NL) .................................... 2021243

(51) Int. Cl.
| A23P 30/25 | (2016.01) |
| A22C 11/00 | (2006.01) |
| A23B 4/023 | (2006.01) |
| A23B 4/048 | (2006.01) |
| A23L 13/60 | (2016.01) |

(52) U.S. Cl.
CPC .............. *A23P 30/25* (2016.08); *A22C 11/00* (2013.01); *A23B 4/0235* (2013.01); *A23B 4/048* (2013.01); *A23L 13/62* (2016.08); *A23L 13/65* (2016.08); *A23V 2002/00* (2013.01)

(58) Field of Classification Search
CPC . A23L 13/65; A23L 5/19; A23L 13/42; A22C 13/0006; A22C 11/00; A22C 13/0016; A23P 30/25; A23B 4/0053
See application file for complete search history.

(56) References Cited

U.S. PATENT DOCUMENTS

| 3,533,809 A | 10/1970 | Cohly et al. |
| 3,622,353 A | 11/1971 | Bradshaw et al. |
| 5,989,609 A | 11/1999 | Kobussen et al. |
| 7,288,214 B2 | 10/2007 | Bergmans et al. |
| 11,026,436 B2 | 6/2021 | Reuling et al. |
| 11,191,280 B2 | 12/2021 | Van De Nieuwelaar et al. |
| 2003/0134014 A1 | 7/2003 | Bergmans et al. |
| 2005/0003063 A1 | 1/2005 | Kobussen |
| 2008/0317915 A1 | 12/2008 | Hu et al. |
| 2009/0162502 A1 | 6/2009 | Bueker et al. |
| 2011/0117254 A1 | 5/2011 | Van De Nieuwelaar et al. |
| 2015/0030733 A1 | 1/2015 | Van De Nieuwelaar et al. |
| 2016/0150799 A1 | 6/2016 | Reuling et al. |
| 2017/0196231 A1 | 7/2017 | Massouda et al. |
| 2018/0049453 A1 | 2/2018 | Schultz et al. |
| 2018/0103664 A1 | 4/2018 | Nielsen |
| 2018/0310573 A1 | 11/2018 | Van De Nieuwelaar et al. |

FOREIGN PATENT DOCUMENTS

| GB | 1210549 A | 10/1970 |
| JP | S4810545 B1 | 4/1973 |
| JP | 2003515351 A | 5/2003 |
| JP | 2007236394 A | 9/2007 |
| JP | 2011520474 A | 7/2011 |
| JP | 2016531565 A | 10/2016 |
| JP | 2018512852 A | 5/2018 |
| JP | 2019518474 A | 7/2019 |
| NL | 6909339 A | 12/1969 |
| WO | 0141576 A1 | 6/2001 |
| WO | 2009145626 A1 | 12/2009 |
| WO | 2015009143 A1 | 1/2015 |

OTHER PUBLICATIONS

Brazilian Office Action from Corresponding Brazilian Patent Application No. BR112020025045-7, Jun. 19, 2023.
Office Action from corresponding Japanese Application No. 2020-573480, Apr. 25, 2020.
Costa-Corredor et al., "Ion Uptakes and Diffusivities in Pork Meat Brine-Salted with NaCl and K-Lactate," LWT—Food Science and Technology, Mar. 18, 2010, vol. 43, pp. 1226-1233.
Search Report and Written Opinion from corresponding Dutch Application No. NL2021243, Mar. 5, 2019.
International Search Report and Written Opinion from PCT Application No. PCT/NL2019/050411, Jan. 28, 2020.

*Primary Examiner* — Vera Stulii
(74) *Attorney, Agent, or Firm* — Workman Nydegger

(57) ABSTRACT

The present invention relates to a set of brine solutions for use in a method for in-line processing of food products, said method comprises the steps of a) co-extruding a food dough into a flow of co-extruded food products having a coating that comprises a protein, or a hybrid coating of a protein and a polymer, and b) subjecting the flow of co-extruded food products to a food product strengthening step, said food product strengthening step comprises the step of subjecting the flow of food products to a first brine solution comprising a salt solubilised in an aqueous medium, and a second brine solution comprising a buffer salt solubilised in an aqueous medium. The present invention further relates to a method for in-line processing of food products using the set of brine solutions of the present invention and a lactate salt comprising brine solution.

10 Claims, No Drawings

SET OF BRINE SOLUTIONS AND METHOD FOR IN-LINE PROCESSING FOOD PRODUCTS

FIELD OF THE DISCLOSURE

The present invention relates to a set of brine solutions and a method for in-line processing of food products using the set of brine solutions of the present invention. The present invention further relates to a brine solution having improved pH setting characteristics, a system for in-line processing of food products using the method of the present invention and use of the set of brine solutions of the present invention in a method for in-line processing of food products.

BACKGROUND

Methods of co-extrusion in food products are generally known and described in, among others, Dutch patent NL 6909339. This document describes the coating of a strand of food dough with a casing layer of protein, e.g. collagen, by means of co-extrusion. Following extrusion the coated strand is guided for strengthening purposes through a coagulation bath. Under the influence of the coagulation solution the protein coagulates and/or precipitates and the casing layer is strengthened. A strand of food dough is thus formed which is at least partially coated with a strong casing layer of protein, i.e. a collagen comprising casing.

A drawback of the known methods is that the characteristics of the casing material, and therefore the processability of the food product, may change during the manufacturing of the flow of co-extruded food products, i.e. a flow of individual sausages, a strand of food products or a flow of sausages connected to each other (head-tail connections). The change in the characteristics of the casing material is difficult to predict. Even further, the change in the characteristics of the casing material is irreversible. Therefore, once the characteristics of the casing material have been changed the flow of food products can no longer be processed to obtain a final food product, i.e. a sausage, having an acceptable quality.

A particular drawback of the known methods using protein or protein comprising viscous gelling agent as a casing material for the co-extrusion of elongated food products are the uncontrolled properties (especially the surface conditions) of the final food products. It has been observed that by changing the process settings after co-extrusion of the strand of food dough and the casing material, the characteristics of the protein casing material may irreversibly change. The change may include the change of surface characteristics of the casing material with regard to smoothness of the surface of the food product, i.e. the "look-and-feel" of the food product. By changing the process settings after co-extrusion in subsequent processing steps, such as brining, separating, crimping, smoking, drying, packaging, cooking and/or chilling of the co-extruded elongated food product, the obtained food product may, different from the normally desired smooth, nice looking and stable surface, uncontrolled change into a food product with undesired surface conditions like e.g. sticky, inconsistent and/or smudgy surfaces. Such uncontrolled irreversible change in surface characteristics results in the less processability of the flow of food products and, as a consequence, the flow of food products (or at least a part of the flow of food products) may even have to be discarded.

In view of the above there is a need to enhance the control of the production of co-extruded food products, and more specific to enhance the control of the product characteristics of the coating (i.e. casing) material during the manufacturing and the further life stages of the food products.

DETAILED DESCRIPTION OF VARIOUS EMBODIMENTS

The present invention provides for this purpose a set of brine solutions comprising a first brine solution and a second brine solution for use in a method for in-line processing of food products, said method comprises the steps of co-extruding a food dough into a flow of co-extruded food products having a coating that comprises a protein, or a hybrid coating of a protein and a polymer, and subjecting the flow of co-extruded food products to a food product strengthening step, said food product strengthening step comprises the steps of subjecting the flow of food products to i) a coating moisture content reducing step using the first brine solution, the first brine solution comprising a salt solubilised in an aqueous medium, and subsequently subjecting the flow of food products to ii) a coating pH setting step using the second brine solution, the second brine solution comprising a buffer salt solubilised in an aqueous medium. It was found that the processability of the co-extruded elongated food product and the unexpected irreversible change in coating characteristics strongly depends on the physical state of the protein or hybrid coating comprising the protein. As a consequence, by controlling the physical state of the protein, the change in coating characteristics, such as smoothness of the surface of the coating, can be controlled, i.e. prevented. In particular it was found that by providing a set brine solutions having on one end coating moisture content reducing characteristics and on the other end coating pH setting, i.e. buffering, characteristics, not only the pH of the brine solution can be maintained for a prolonged time, but also the pH of the coating of the flow of food products can be maintained during the further treatment of the flow of food products, thus providing an improved method wherein the physical state of the protein is controlled in a more sustainable and reliable manner, i.e. increasing the processability of the flow of food products significantly.

With regard to the physical state of the protein, it is noted that such physical state may include three types of physical states: the crystalline phase, the helical phase and the randomly coiled phase. It was found that the irreversible change in coating characteristics is expected in case a protein in the helical or crystalline form is converted into a protein having a randomly coiled form. The protein comprising coating of the food product comprising a protein in the helical or crystalline form is characterized by a smooth, attractive looking and/or stable surface, whereas the protein comprising coating of the food product comprising a protein in the randomly coiled form exhibits a more sticky, inconsistent and/or smudgy surface. As a consequence, in an embodiment of the method of the present invention, the protein is in the helical and/or crystalline form.

In an embodiment of the present invention, during performance of the method using the set of brine solutions of the present invention the physical state of the protein may vary between the helical and crystalline form during subsequent food product treating steps, e.g. thermal treating steps and optional post-thermal treating steps. Since either the helical or crystalline physical state of the protein have a positive effect onto the coating characteristics of the food product, the actual state of the protein may vary between those two states. However, it in particular it is preferred that the physical state of the protein does not change after co-extruding the flow of food products. To maintain the same product characteristics, such as surface smoothness, surface colour, cooking characteristics of the obtained food product, or the like, it is in particular advantageous to maintain the same physical state of protein during the co-extrusion of the flow of food products and any further processing step. Even further, particular good results are obtained with a protein that is in the crystalline form throughout the method using the set of brine solutions of the present invention. By providing a coating comprising a protein that is in the crystalline form, the coating of the food product has the most optimal thermal stability, i.e. providing a product that can be partially or fully cooked without having undesired surface characteristics.

The protein of the present invention may be selected from the group consisting of edible proteins able to form a coating by gelling (coagulation and/or precipitation; whether or not in the presence of a coagulating agent) after co-extrusion. A particular preferred protein comprises collagen.

The polymer comprised in the hybrid coatings of the present invention may be selected form the group consisting of edible polymers able to form a coating in combination with the protein present in the hybrid coating. Preferably the polymer is selected from the group consisting of polysaccharides. A preferred polymer may comprise alginate and/or cellulose.

The flow of co-extruded food products may include a strand of co-extruded food product, which strand of co-extruded food product still needs to be divided into separated individual food products (i.e. sausages). The flow of food products may include an intermediate form of a strand wherein the individual food products are still linked to each other (head-tail connection) to form a string of linked food products.

The first brine solution of the present invention preferably comprises a salt selected from the group consisting of edible salts, such as sodium chloride. Preferably, the first brine solution consists essentially of a salt solubilised in an aqueous medium.

In an embodiment of the present invention, the first brine solution comprising a saturated salt solution. Alternative first brine solutions may comprise at least 20 weight-% salt wherein the weight-% is calculated based on the total weight of the brine solution. In a preferred embodiment of the present invention, the first brine solution may comprise at least 25 weight-% salt or preferably at least 30 weight-% salt.

The second brine solution of the present invention preferably comprises buffer salts selected form the group consisting of buffer salts having a pKa at 20° C. of at least 2.5. In a particular preferred embodiment the buffer salts may be selected form the group consisting of buffer salts having a pKa at 20° ° C. between 3.0 and 5.5. It was found that by providing a second brine solution comprising buffer salts having a pKa between 3.0 and 5.5 the pH of the brine solution can be maintained for a significant longer timespan compared to brine solutions comprising no buffer salts at all. Even further, the pH of the second brine solution can be maintained for a further prolonged timespan in case buffer salts are selected from the group consisting of buffer salts having a pKa at 20° C. between 3.5 and 5.0.

In an embodiment of the present invention, the second brine solution may comprise buffer salts selected from the group consisting of lactate salts, acetate salts, phosphate salts, and carbonate salts. Preferred salts may include sodium and/or potassium salts, such as sodium lactate, potassium lactate, sodium acetate, potassium acetate, disodium phosphate, dipotassium phosphate, sodium carbonate and potassium carbonate. It is noted that the second brine solution of the present invention may comprise a combination of two or more of the above-listed salts.

In a further embodiment of the present invention, the amount of the buffer salt comprised in the second brine solution of the present invention is chosen such that the second brine solution having a pH of at least 5.0. In particular the second brine solution comprising the buffer salt of the present invention may have a pH between 5.0 and 8.0. It was found that by providing a second brine solution of at least 5.0 the physical state of the protein, e.g. collagen, can be controlled in a more reliable way. Also, by providing a second brine solution having a pH of less than 8.0, the colour of the final food product is still in compliance with the pre-defined and preferred colour of the final food product to be obtained.

Although the amount of buffer salt may be chosen such that the pH of the second brine solution of the present invention is within a predefined range, it is also possible to provide a second brine solution comprising a saturated salt solution. Alternative second brine solutions may comprise at least 30 weight-% salt wherein the weight-% is calculated based on the total weight of the brine solution. In a preferred embodiment of the present invention, the second brine solution may comprise between 40 weight-% and 60 weight-% salt.

In case a lactate salt, such as sodium lactate or potassium lactate, is used as a buffer salt, the second brine solution may comprise between 50 weight-% and 80 weight-% of lactate salt. In a preferred embodiment, the second brine solution may comprise about 60 weight-% of lactate salt.

In case a carbonate salt, such as sodium carbonate or potassium carbonate, is used as a buffer salt, the second brine solution may comprise between 50 weight-% and 70 weight-% of carbonate salt. In a preferred embodiment, the second brine solution may comprise about 60 weight-% of carbonate salt.

In case a phosphate salt, such as disodium phosphate or dipotassium phosphate, is used as a buffer salt, the second brine solution may comprise between 30 weight-% and 50 weight-% of phosphate salt. In particular, the second brine solution may comprise about 40 weight-% of phosphate salt.

In a further embodiment of the present invention, the second brine solution may comprise a salt not being a buffer salt, such as sodium chloride. Although a second brine solution comprising a buffer salt only is preferred, it is noted that the combination, i.e. a second brine solution comprising a buffer salt and a salt not being a buffer salt, provides good results in controlling and maintaining the pH of the second brine solution over a prolonged timespan.

In another aspect the present invention relates to a method for in-line processing of food products, comprising the step of co-extruding a food dough into a flow of co-extruded food products having a coating that comprises a protein, or a hybrid coating of a protein and a polymer, wherein the method subsequently comprises the successive steps of:
  a) subjecting the flow of co-extruded food products to a food product strengthening step, said food product strengthening step comprises the step of subjecting the flow of food products to a set of brine solutions; and
  b) thermally treating the flow of food products obtained in step a), wherein in step a) the set of brine solutions comprises the set of brine solutions of the present invention.

It was found that by providing a strengthening step wherein the moisture content of the coating and the pH of the coating is controlled and maintained by using the set of brine solutions of the present invention, the strengthening step may be subsequently combined advantageously with a thermal treating step.

In a preferred embodiment of the present invention the thermal treating step of step b) may comprise a step wherein the flow of food products is subjected to two or more thermal treating steps. Such single multiphase process step may comprise subjecting the flow of food products to at least two thermal treating steps. However, further thermal treating steps may be applied to the flow of food products as well. For example, in a further preferred embodiment the flow of food products may be subsequently subjected, i.e. after subjecting the flow of food products to the first and second thermal treating step, to a third thermal treating step. Even four or further subsequent thermal treating steps may be applied as well. Typically, the single multiphase process step may be configured to include about six thermal treating steps. It is noted that the configuration of the thermal treating step of step b) depends on the specific food product to be produced and the product line design the method is applied to. For example, for one product the thermal treating step may comprise four thermal treating steps, such as drying, heating, partially cooking and (fully) cooking, whereas for another product the thermal treating step may comprise three thermal treating steps, wherein the product leaving the single multiphase process step is only partially cooked.

The thermal treating step of step b) may be selected from the group consisting of drying, heating, partially cooking, cooking, and cooling the flow of food products. As used herein the term "drying" refers to a process step wherein an excess of water or moisture is removed from the surface of the flow of food products and wherein coagulation of the coating and/or cooking of the food dough is prevented.

As used herein the term "heating" refers to a process step wherein the coating coagulates, although the food dough is not cooked.

As used herein the term "partially cooking" refers to a process step wherein the food dough is cooked only partially, i.e. resulting in a food product not yet readily edible; still needs to be cooked further, e.g. in a further post-multiphase treating step or by the end user during preparing the food product for eating.

As used herein the term "cooking" refers to a process step wherein the food dough is cooked resulting in a food product which is edible. An alternative term for a food product subjected to a cooking step is a "fully cooked" food product.

As used herein the term "cooling" refers to a process step wherein the temperature of the food product is reduced using a cooling medium, such as tap water typically having a temperature of about 10° ° C. to 15° C. or cold air.

As used herein the term "chilling" refers to a process step wherein the food product is subjected to a chilling medium, which is a medium (e.g. water), which is deliberately made colder.

As already stated above, different combinations of two or more thermal treating steps are available during the method of the present invention depending on the specific properties of the food product to be obtained, the starting materials used for producing the food product, the design of the production line the method is applied to, and other parameters. An example of such combination may relate to a method wherein the first thermal treating step comprises b.1) drying the flow of food products, and/or the second thermal treating step comprises b.2) at least partially cooking the flow of food products. Another example of such combination may relate to a method wherein the first thermal treating step comprises b.i) drying the flow of food products, the second thermal treating step comprises b.ii) heating the flow of food products, and/or the third thermal treating step comprises b.iii) at least partially cooking the flow of food products.

With regard to the process conditions of the thermal treating steps of the present invention, it is noted that the temperatures may range from 50° C. to 150° C., the relative humidity ranges from 0% to 100%, and the air velocity may range from 1 m/s to 10 m/s.

In a preferred embodiment the thermal treating step comprises drying the flow of food products at a temperature of between 50° C. to 80° C., preferably between 60° C. to 75° C. The relative humidity during drying the flow of food products may be up to 10%, preferably up to 5%.

With regard to heating the flow of food products, the thermal treating step may comprise a temperature of between 60° C. to 90° C., preferably between 70° C. and 80° C. The relative humidity during heating the flow of food products may be between 15% to 40%, and more preferably between 25% and 35%.

Partially cooking the flow of food products may include a temperature of between 70° C. to 100° C., and more preferred between 80° C. and 90° C. The relative humidity during partially cooking the flow of food products may be between 30% to 60%, preferably between 40% and 50%.

In a further embodiment the thermal treating step comprises cooking the flow of food products at a temperature of between 70° C. to 100° C., preferably between 80° C. to 90° C. The relative humidity during cooking the flow of food products may be between 60% to 80%, and more preferably between 65% and 75%.

The method of the present invention may further comprise the step of separating the strand of co-extruded food product into individual food products. As already mentioned above, the flow of food products may comprises a strand of co-extruded food product and wherein the method of the present invention further comprises the step of:

separating the strand of co-extruded food product into individual food products, before subjecting the flow of food products to step a).

Alternatively, the strand of co-extruded food product may be divided into individual food product after subjecting the flow of food products to step a) and preferably before subjecting the flow of food products to step b). However, in a preferred embodiment the method of the present invention comprises an initial hardening step with a significant shorter duration (like 0.1 to 0.5 seconds) and directly after, or even, during co-extrusion of the strand of co-extruded food product, compared to the strengthening step (typically about 30 seconds to 60 seconds in total) followed by the separation of the strand of co-extruded food product into individual food products. It is noted that the initial hardening step provides a first initial strength to the coating of the strand of co-extruded food product to facilitate the separation of the strand of co-extruded food product into individual food products. It is further noted that the initial hardening step may be performed by subjecting the strand of co-extruded food product to a brine solution, e.g. the first brine solution, the second brine solution or an even further brine solution. Therefore, in a preferred embodiment the method of the present invention comprises the step of:

before separating the strand of co-extruded food product into individual food products, subjecting the strand of co-extruded food product to an initial hardening step, wherein the initial hardening step comprises subjecting the strand of co-extruded food product to a brine solution selected from the group consisting of the first brine solution, the second brine solution, a further brine solution and combinations thereof. In an embodiment, the brine solution used for the initial hardening step is preferably the first brine solution.

Due to the short duration of the initial hardening step, the maintenance of the pH of the brine solution used in the initial hardening step is less critical. Therefore, a brine solution comprising sodium chloride only, such as the first brine solution, could be sufficient for such step without running the risk of causing a change in the physical state of the protein.

In an embodiment of the present invention, the duration of use of both brine solutions comprised within the set of brine solutions of the present invention differs. In a preferred embodiment, the duration of use of the first brine solution is shorter compared to the duration of use of the second brine solution. In an embodiment of the present invention the duration of use of the first brine solution is significantly shorter compared to the duration of use of the second brine solution. The term 'significantly" as used herein may refer to a difference with a factor 10 to about 20. Preferably, the duration of use of the first brine solution is about 1 second to about 5 seconds, whereas the duration of use of the second brine solution is about 30 seconds to about 60 seconds.

Further, the method of the present invention may comprise the step of:
before subjecting the flow of food products to step b), applying liquid smoke to the flow of food products.

In a further aspect of the present invention, the invention relates to a brine solution comprising a salt of lactic acid. It was found that by providing a brine solution, e.g. the second brine solution of the present invention, comprising a salt of lactic acid, not only the look-and-feel of the final product has improved properties, but also the taste of the final product is improved significantly.

The salt of lactic acid may be a potassium salt of lactic acid or a sodium salt of lactic acid. The lactate salt of the brine solution of the present invention may be a L-lactate. In a further preferred embodiment, the lactate salt is produced by fermentation from sugar. An example of such a suitable and preferred lactate salt is marketed under the tradename PURASAL® HiPure P Plus (Corbion). The brine solution of the present invention may consist essentially of the lactate salt solubilised in an aqueous medium.

In an embodiment of the present invention, the brine solution comprising a saturated lactate salt solution. Alternative brine solutions may comprise at least 30 weight-% lactate salt wherein the weight-% is calculated based on the total weight of the brine solution. In a preferred embodiment of the present invention, the brine solution may comprise between 40 weight-% and 60 weight-% lactate salt.

The present invention further relates to a system for in-line processing of food products using the method of the present invention.

The present invention further relates to the use of the set of brine solutions of the present invention in a method for in-line processing of food products. In particular, the present invention relates to the use of the set of brine solutions in a strengthening step in a method for in-line processing of food products.

The invention claimed is:

1. A method for in-line processing of food products, comprising the step of co-extruding a food dough into a flow of co-extruded food products having a coating that comprises a protein, or a hybrid coating of a protein and a polymer, wherein the method subsequently comprises the successive steps of:
   a) subjecting the flow of co-extruded food products to a food product strengthening step, said food product strengthening step comprises the step of subjecting the flow of food products to a set of brine solutions comprising a first brine solution and a second brine solution; and
   b) thermally treating the flow of food products obtained in step a);
   wherein said food product strengthening step of step a) comprises the steps of subjecting the flow of food products to:
      (i) a coating moisture content reducing step using the first brine solution, the first brine solution consisting essentially of a salt solubilized in an aqueous medium and, subsequently,
      (ii) a coating pH setting step using the second brine solution, the second brine solution comprising a buffer salt solubilized in an aqueous medium;
   wherein the first brine solution is separate and distinct from the second brine solution.

2. The method according to claim 1, wherein in step b) the flow of food products is subjected to two or more thermal treating steps.

3. The method according to claim 2, wherein the two or more thermal treating steps are selected from the group consisting of drying, heating, partially cooking, cooking, and cooling the flow of food products.

4. The method according to claim 1, wherein the flow of food products comprises a strand of co-extruded food product and wherein the method further comprises the step of:
separating the strand of co-extruded food product into individual food products, before subjecting the flow of food products to step a).

5. The method according to claim 4, wherein the method further comprises the step of:
before separating the strand of co-extruded food product into individual food products, subjecting the strand of co-extruded food product to an initial hardening step, wherein the initial hardening step comprises subjecting the strand of co-extruded food product to a brine solution selected from the group consisting of the first brine solution, the second brine solution, a further brine solution and combinations thereof.

6. The method according to claim 1, wherein the method further comprises the step of:
before subjecting the flow of food products to step b), applying liquid smoke to the flow of food products.

7. The method according to claim 1, wherein the coating moisture content reducing step using the first brine solution has a shorter duration of use than the coating pH setting step using the second brine solution.

8. The method according to claim 1, wherein the salt of the first brine solution is sodium chloride.

9. The method according to claim 1, wherein the buffer salt of the second brine solution is of lactic acid.

10. The method according to claim 1, wherein the buffer salt of the second brine solution has a pKa at 20° C. between 3.0 and 5.5.

* * * * *